United States Patent
Chang et al.

(10) Patent No.: US 8,273,246 B2
(45) Date of Patent: Sep. 25, 2012

(54) SYSTEM AND METHOD FOR TREATING AMMONIA-BASED WASTEWATER

(75) Inventors: Kuan-Foo Chang, Changhua County (TW); Sheng-Hsin Chang, Miaoli County (TW); Shwu-Huey Perng, Hsinchu County (TW); Wang-Kuan Chang, Hsinchu (TW); Huey-Song You, Hsinchu (TW); Shan-Shan Chou, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 358 days.

(21) Appl. No.: 12/482,342

(22) Filed: Jun. 10, 2009

(65) Prior Publication Data

US 2010/0163482 A1 Jul. 1, 2010

(30) Foreign Application Priority Data

Dec. 29, 2008 (TW) .............................. 97151210 A

(51) Int. Cl.
*C02F 3/30* (2006.01)
(52) U.S. Cl. .......... 210/605; 210/615; 210/622; 210/623
(58) Field of Classification Search .................. 210/605, 210/621, 622, 623, 903, 615
See application file for complete search history.

(56) References Cited

U.S. PATENT DOCUMENTS

| | | | |
|---|---|---|---|
| 4,999,111 A | 3/1991 | Williamson | |
| 5,611,927 A | 3/1997 | Schmid | |
| 5,643,453 A | 7/1997 | Pannier et al. | |
| 6,210,578 B1 * | 4/2001 | Sagastume et al. | 210/605 |
| 6,592,757 B2 | 7/2003 | Nasr | |
| 6,758,972 B2 | 7/2004 | Vriens et al. | |
| 7,001,516 B1 | 2/2006 | Hong et al. | |
| 7,033,503 B2 | 4/2006 | Park et al. | |
| 2005/0035059 A1 * | 2/2005 | Zhang et al. | 210/605 |
| 2006/0191846 A1 * | 8/2006 | Sumino et al. | 210/603 |
| 2006/0249449 A1 * | 11/2006 | Nakhla et al. | 210/605 |
| 2007/0193949 A1 * | 8/2007 | You et al. | 210/605 |

FOREIGN PATENT DOCUMENTS

CN 1293154 A 5/2001

OTHER PUBLICATIONS

First examination opinion notification issued by the China Intellectual Property Office on Apr. 25, 2011, for the above-referenced application's counterpart application in China (Application No. 200910005332.8). Second examination opinion notification issued by the China Intellectual Property Office on Oct. 19, 2011, for the above-referenced application's counterpart application in China (Application No. 200910005332.8).
Hou, "Chinese Oil-Refining Technology", 2nd edition, p. 681, Sinopec, Jul. 31, 2001.
A third examination opinion (rejection) issued by the China Intellectual Property Office, on Apr. 20, 2012, in regard to the above-referenced application's counterpart application in China (Application No. 200910005332.8).

* cited by examiner

*Primary Examiner* — Fred Prince
(74) *Attorney, Agent, or Firm* — Pai Patent & Trademark Law Firm; Chao-Chang David Pai

(57) ABSTRACT

A system for treating ammonia-based wastewater is provided. The system includes a first reactor, including: denitrification bacteria for denitrification; a second reactor disposed on the back of the first reactor, wherein the second reactor includes an aerator and aerobic heterotrophic bacteria, and has an HRT of less than 6 hours; a third reactor disposed on the back of the first reactor, wherein the third reactor contains nitrification bacteria carried on the carriers for improving nitrification; and a solid-liquid-separating reactor disposed on the back of the third for separating the solids and liquids in the effluent of the third reactor.

8 Claims, 6 Drawing Sheets

SYSTEM AND METHOD FOR TREATING AMMONIA-BASED WASTEWATER

CROSS REFERENCE TO RELATED APPLICATIONS

This Application claims priority of Taiwan Patent Application No. 097151210, filed on Dec. 29, 2008, the entirety of which is incorporated by reference herein.

BACKGROUND OF THE INVENTION

1. Field of the Invention

The present invention relates to environmental engineering, and in particular relates to a system for treating wastewater containing ammonia.

2. Description of the Related Art

For public or private wastewater treatments, removal of ammonia is often required. Ammonium is usually produced from nitrogen following aerobic or anaerobic treatments of wastewater. In a denitrification process, ammonium is oxidized to become nitrate, and then the nitrate is reduced to become nitrogen gas to be released into the atmosphere.

In a biological process, ammonium is oxidized by the ammonium oxidation bacteria (AOB) to become nitrite, and then the nitrite is sequentially oxidized by the nitrite oxidation bacteria (NOB) to become nitrate, and then the nitrate is reduced by denitrifying bacteria to become nitrogen gas to be released into the atmosphere.

FIG. 1 illustrates a conventional wastewater treatment system 10. The conventional wastewater treatment system 10 includes an anaerobic reactor 12, an anoxic reactor 14, a nitrification reactor 16, and a solid-liquid separating reactor 18. However, when the C/N (carbon/nitrogen) ration or the concentration of organic nitrogen is high, proliferated heterotrophic bacteria in the nitrification reactor 16 inhibits the growth of autotrophic bacteria and nitrification. Thus, a novel method and system for treating ammonia-based wastewater is required to improve treatment efficiency thereof.

BRIEF SUMMARY OF THE INVENTION

The invention provides a system for treating ammonia-based wastewater, comprising: a first reactor, comprising denitrification bacteria for denitrification; a second reactor disposed on the back of the first reactor, wherein the second reactor includes aerator and aerobic heterotrophic bacteria, and has an HRT (hydraulic retention time) of less than 6 hours for reducing the organic materials in an effluent of the second reactor; a third reactor disposed on the back of the second reactor, wherein the third reactor contains nitrification bacteria for treating the effluent of the second reactor, and a solid-liquid-separating reactor disposed on the back of the third reactor for separating the solids and liquids in the effluent of the third reactor.

The invention further provides a method for treating ammonia-based wastewater, comprising: conducting ammonia-based wastewater into a first reactor, wherein the first reactor comprises denitrification bacteria for denitrification; conducting effluent of the first reactor into a second reactor, wherein the second reactor includes aerator and aerobic heterotrophic bacteria, and has an HRT (hydraulic retention time) of less than 6 hours for reducing the organic materials in an effluent of the second reactor; conducting the effluent of the second reactor into a third reactor, wherein the third reactor comprises nitrification bacteria to convert ammonia in the effluent of second reactor to nitrite and nitrate, and conducting effluent of the third reactor into a solid-liquid-separating reactor for separating the solids and liquids in the effluent of the third reactor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
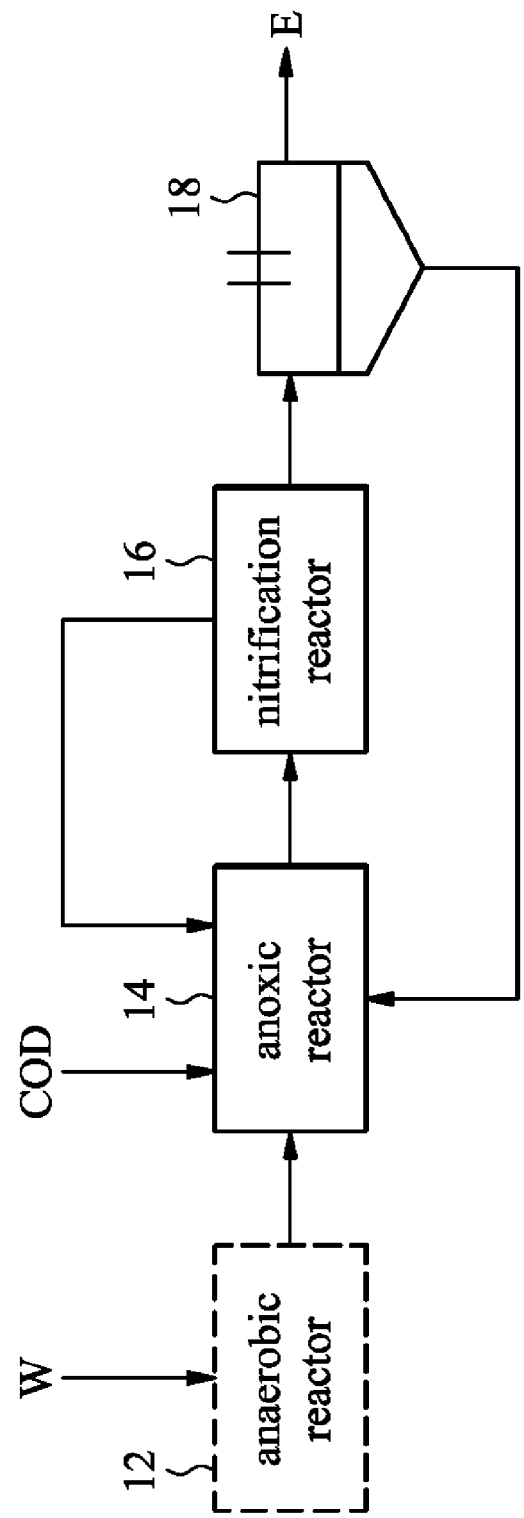
FIG. 1 shows a conventional A/O wastewater treatment system.
Figure 2:
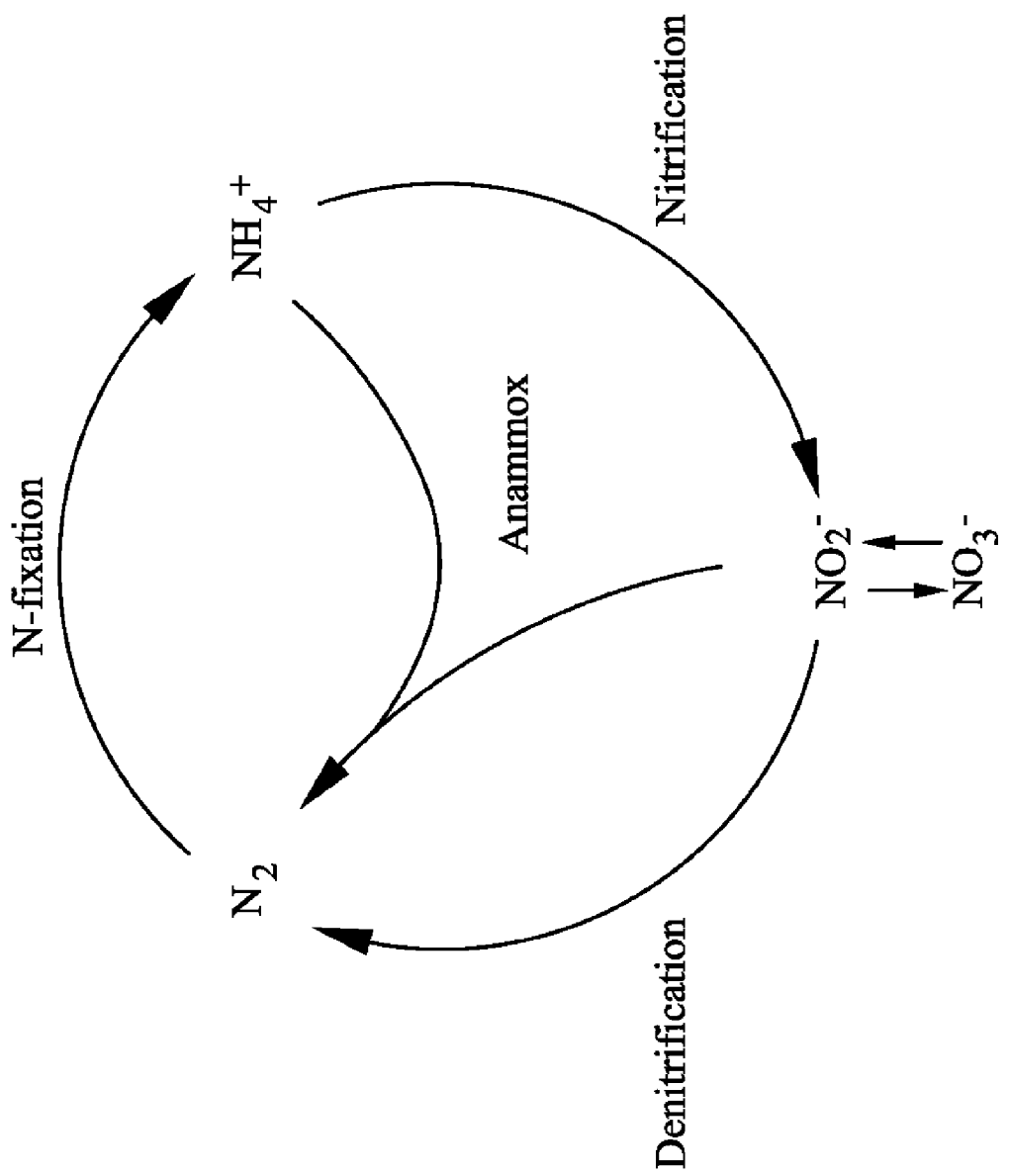
FIG. 2 shows circulation of nitrogen in nature.

Referring to FIG. 2, in nature, ammonium ion ($NH_4^+$) can be converted to nitrite ion ($NO_2^-$) by ammonium oxidation bacteria, and then the nitrite ion can be converted to nitrate ion ($NO_3^-$) by nitrite oxidation bacteria. The conversion is called "nitrification". During anaerobic (low oxygen) conditions, nitrate is reduced to nitrite and then further reduced to nitrogen gas by denitrification bacteria. The conversion is called "denitrification".

The invention provides a treatment system for ammonia-based wastewater. The treatment system of the invention improves the growth of nitrification bacteria and nitrification, by control of the C/N ratio of the nitrification reactor.

Figure 3:
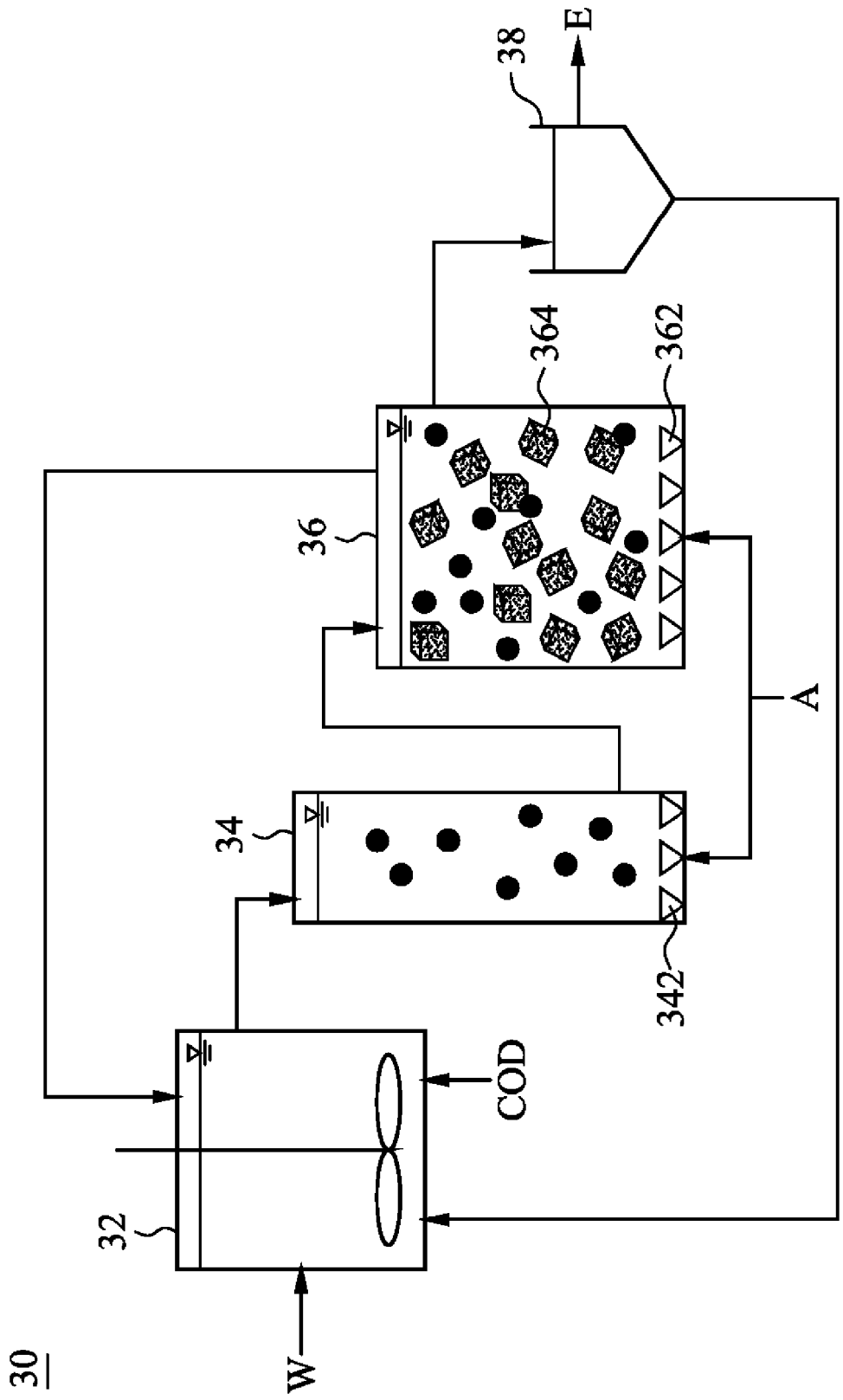
FIG. 3 shows a wastewater treatment system according to an embodiment of the invention.

FIG. 3 illustrates an embodiment of a wastewater treatment system according to the invention. It should be understood that the drawings herein are made in simplicity, and are utilized for illustrating associated elements related to the invention. In practical usage however, the wastewater treatment system is more complexly structured.

Referring to FIG. 3, the wastewater treatment system 30 of the invention includes a denitrification reactor 32, an aerobic reactor 34, a nitrification reactor 36, and a solid-liquid-separating reactor 38. Because the mixture of the wastewater W and the effluent of the nitrification reactor 36 are conducted back into the denitrification reactor 32, the influent of the denitrification reactor 32 contains ammonia, nitrate and carbon source COD. The denitrification bacteria of the denitrification reactor 32 converts nitrate to nitrogen gas and releases the nitrogen gas into the atmosphere using carbon source COD. Note that ammoinia still exists in the denitrification reactor 32. Next, the effluent of the denitrification reactor 32 is conducted into the aerobic reactor 34, wherein the effluent of denitrification reactor 32 mainly contains ammonia and residuary organic materials. The aerobic reactor 34 mainly contains suspended heterotrophic bacteria which absorb the organic materials to decrease the concentration of the organic materials under a short HRT (hydraulic retention time). Then, the effluent of the aerobic reactor 34 containing ammonia and suspended heterotrophic bacteria is conducted into the nitrification reactor 36. The nitrification reactor 36 contains the suspended heterotrophic bacteria and nitrification bacteria carried on carriers. The nitrification bacteria can effectively convert ammonia to nitrate, which is conducted back into the denitrification reactor 32 and removed, under a low C/N ratio condition. Finally, the effluent of the nitrification reactor 36 is conducted into the solid-liquid-separating reactor 38 for separating the solids and liquids in the effluent. In addition, the effluent of the nitrification reactor 36 or the sludge of the solid-liquid-separating reactor 38 can be conducted back into the denitrification reactor 32. The ammonia-based wastewater of the invention particularly refers to a wastewater containing ammonia or organic nitrogen, such as, tetramethylammonium hydroxide (TMAH) and/or monoethanolamine (MEA). The denitrification reactor 32 contains various denitrification microorganisms as shown in Table 1. The denitrification microorganisms can convert nitrate to nitrogen gas. A carbon source COD can be added to the denitrification reactor 32 depending on actual requirement.

TABLE 1

| Reaction | Bacteria |
| --- | --- |
| $NO_3^- \rightarrow NO_2$ | *Thiobacillus thioparus* |
| | *Lysobacter antibioticum* |
| $NO_3^- \rightarrow N_2O$ | *Achromobacter* (*Corynebacterium*) *nephrii* |
| | *Aquaspirillum itersonii* |
| | Various *Pseudomonas* |
| $NO_3^- \rightarrow N_2$ | *Paracoccus denitrificans* |
| | *Thiobacillus denitrificans* |
| | *Rhodopseudomonas spaeroide* |
| | *Alcaligines eutropha* |
| | *Hyphomicrobium* species |
| | *Pseudomonas* species |
| | *Halobacterium* species |
| $NO_2^- \rightarrow N_2$ | *Neisseria* species |
| | *Neisseria* species |
| | *Flavobacterium* species |

The aerobic reactor 34 includes aerobic heterotrophic bacteria, nitrification bacteria, and aerator 342. The aerobic bacteria can significantly decrease the concentration of organic materials in the wastewater. The nitrification bacteria, such as, ammonium oxidation bacteria (AOB) and nitrite oxidation bacteria (NOB), can convert nitrogen to nitrate.

The aerobic reactor 34 has an HRT (hydraulic retention time) of less than 6 hours, preferably about 4 to 6 hours. It is noted that the effluent of the aerobic reactor 34 has a C/N ratio of less than 5, preferably, about 1 to 2. The aerator 342 can pump air A into the aerobic reactor 34 to provide dissolved oxygen. The DO (dissolved oxygen) content of the aerobic reactor 34 is about 2.0, preferably, about 1 to 2.

The nitrification reactor 36 includes an aerator 362 and a biological carriers 364. The aerator 362 can pump air A into the nitrification reactor 36 to provide dissolved oxygen. The DO content of the nitrification reactor 36 is about 2.0, preferably, about 1 to 2. The biological carriers 364 can carry the nitrification bacteria (e.g., ammonium oxidation bacteria (AOB) and nitrite oxidation bacteria (NOB)) to effectively increase the concentration of the nitrification bacteria. The carrier includes, but is not limited to, a PU foam carrier or a nonwoven carrier. It is noted that the C/N ratio in the wastewater of nitrification reactor 36 is less than 5, preferably about 1 to 2, to induce the growth of nitrification bacteria.

The solid-liquid-separating reactor 38 can separate the solids and liquids in the effluent of the nitrification reactor 36 to obtain an effluent solution E. In one embodiment, the solid-liquid-separating reactor 38 can be a settling tank. In another embodiment, the solid-liquid-separating reactor 38 includes a membrane, such as, hollow fiber membrane or a plank membrane, to separate the solids and liquids in the effluent.

After the effluent is conducted into the denitrification reactor 32, the organic materials in the effluent of the denitrification reactor 32 can be significantly absorbed by the aerobic bacteria in the aerobic reactor 34 and the partial ammonia can be converted to nitrate by nitrification bacteria so that the C/N ratio in the effluent of the aerobic reactor 34 is decreased. Under the low C/N ratio condition, the nitrification bacteria of the nitrification bacteria reactor 36 is not be affected by heterotrophic bacteria, and thus the growth of the nitrification bacteria is enhanced to improve nitrification. Thus, the wastewater treatment system of the invention provides high nitrification and ammonia removal efficiency. The ammonia removal rate is about 80%.

In another embodiment, an anaerobic reactor can be disposed on the front of the denitrification reactor 32.

Figure 4:
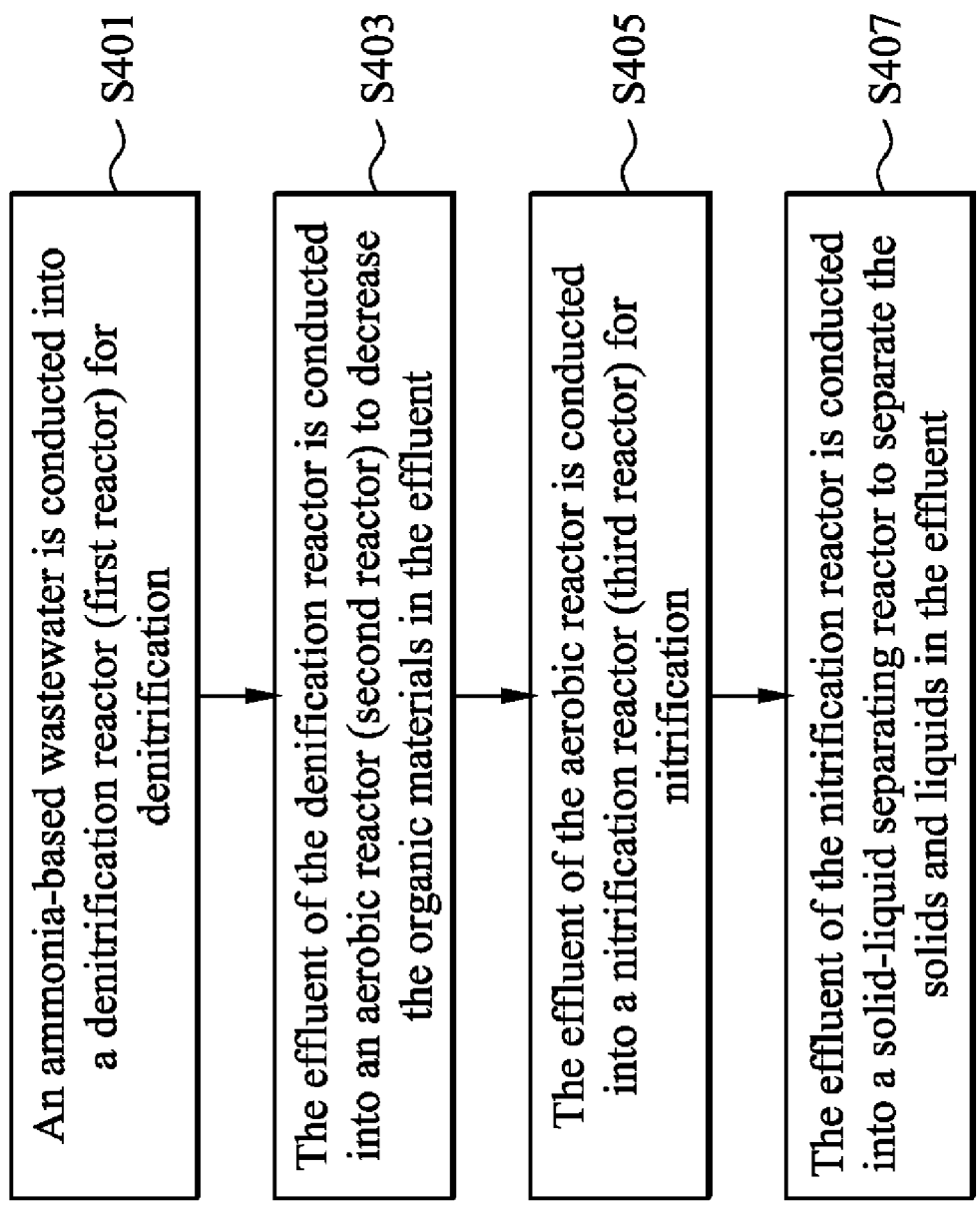
FIG. 4 shows a method for treating ammonia-based wastewater according to an embodiment of the invention.

The invention further provides a method for treating the ammonia-based wastewater as shown in FIG. 4.

Referring to step S401, an ammonia-based wastewater is conducted into a denitrification reactor (first reactor), wherein the denitrification reactor contains denitrifying bacteria for denitrification.

Referring to step S403, the effluent of denitrification reactor is conducted into an aerobic reactor (second reactor), wherein the aerobic reactor includes aerobic heterotrophic bacteria and aerator. The aerobic reactor has an HRT (hydraulic retention time) of less than 6 hours, preferably, about 4 to 6 hours. After treatment of the aerobic reactor, the organic material in the wastewater is decreased so that the C/N ratio in the effluent of aerobic reactor is less than 5, preferably, 1 to 2.

Referring to step S405, the effluent of the aerobic reactor is conducted into the nitrification reactor (third reactor), wherein the nitrification reactor contains nitrification bacteria to convert the ammonia to nitrite and nitrate. In order to increase the growth of nitrification bacteria without being affected by heterotrophic bacteria, the C/N ratio in the wastewater of the nitrification reactor is less than 5, preferably, about 1 to 2.

Referring to step S407, the effluent of the nitrification reactor is conducted into a solid-liquid separating reactor to separate the solids and liquids in the effluent.

In one embodiment, the effluent (or sludge) of the nitrification reactor and solid-liquid separating reactor can be conducted back into the denitrification reactor for denitrification.

In another embodiment, the wastewater is treated with an anaerobic process before the wastewater is conducted into the denitrification reactor.

In the method of the invention, ammonium can be effectively removed, and the removal rate is more than 80%.

EXAMPLE

Example 1

Treatment of Ammonia-Based Wastewater by the System of the Invention

The wastewater treatment system shown in FIG. 3 was used in Example 1. The wastewater treatment system included 8 liters of the denitrification reactor 32, 3 liters of aerobic reactor 34, and 20 liters of nitrification reactor 36. The aerobic reactor 34 contained aerobic heterotrophic bacteria. The nitrification reactor 36 contained denitrification bacteria. The aerobic reactor included an aerator and had an HRT of less than 6 hours.

The wastewater containing 80 mg/L ammonium and 1000 mg/L (or 1500 to 2000 mg/L) of organic carbon was conducted into the denitrification reactor 32, aerobic reactor 34, and nitrification reactor 36, sequentially. The flow rate was 8 ml/min and total hydraulic retention time was 3 days.

Figure 5:
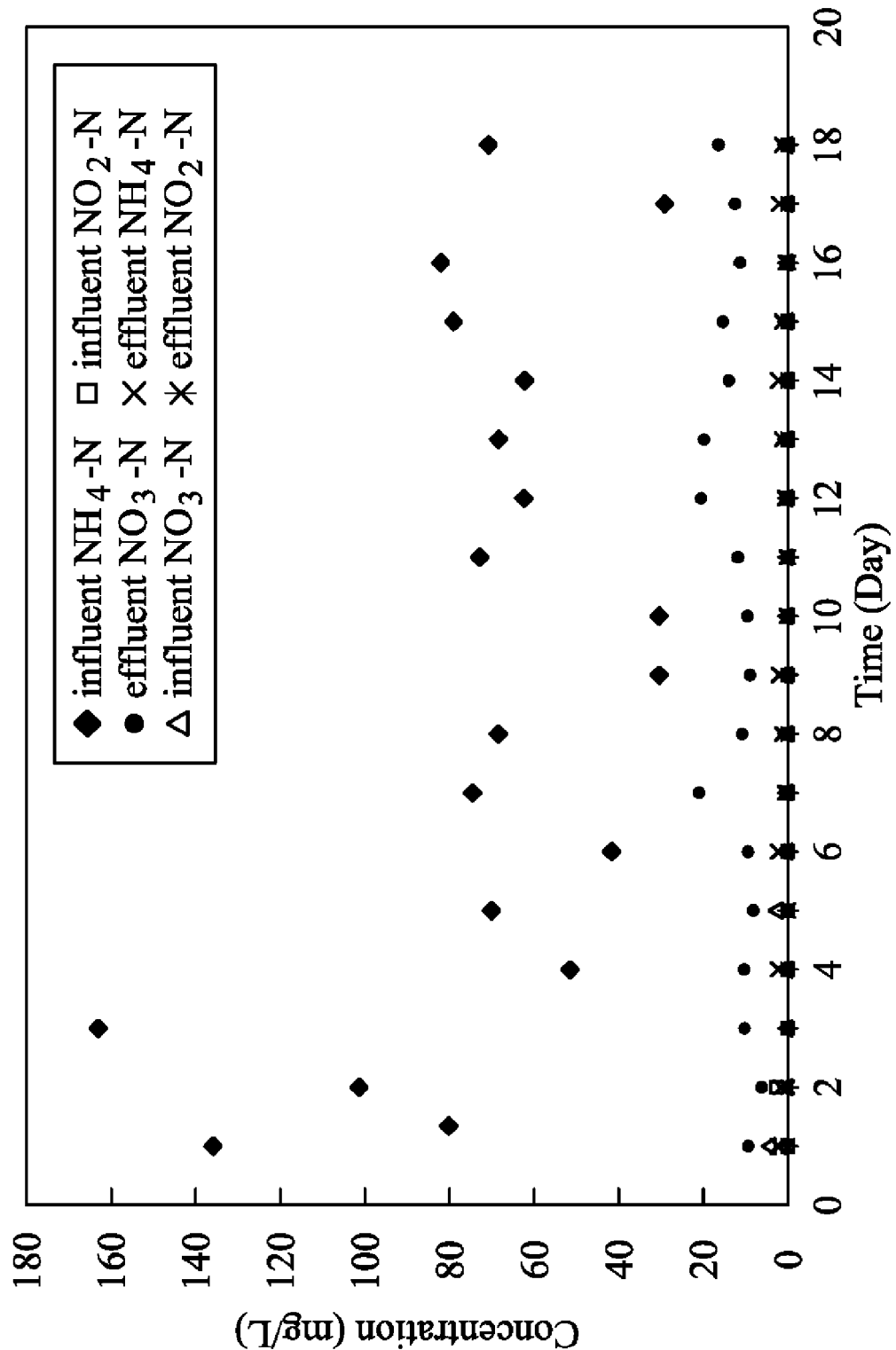
FIG. 5 shows the concentration of ammonium, nitrate, and nitrate in the effluent or influent solution from reactors after treatment of the method of the invention.

FIG. 5 illustrates the concentration of ammonium, nitrate, and nitrite in the influent and effluent solution from rectors. Referring to FIG. 5, the concentration of ammonium in the influent solution was 90 mg/L. After treatment, the concentration of ammonium in the effluent solution was less than 1 mg/L, and the concentration of nitrate in the effluent solution was about 5-10 mg/L (the concentration of the nitrite could not be distinguished, because it was lower than the detection limit of the assay). The results indicated that the wastewater treatment system of the invention can effectively remove ammonium, with removal rate of about 80%.

Figure 6:
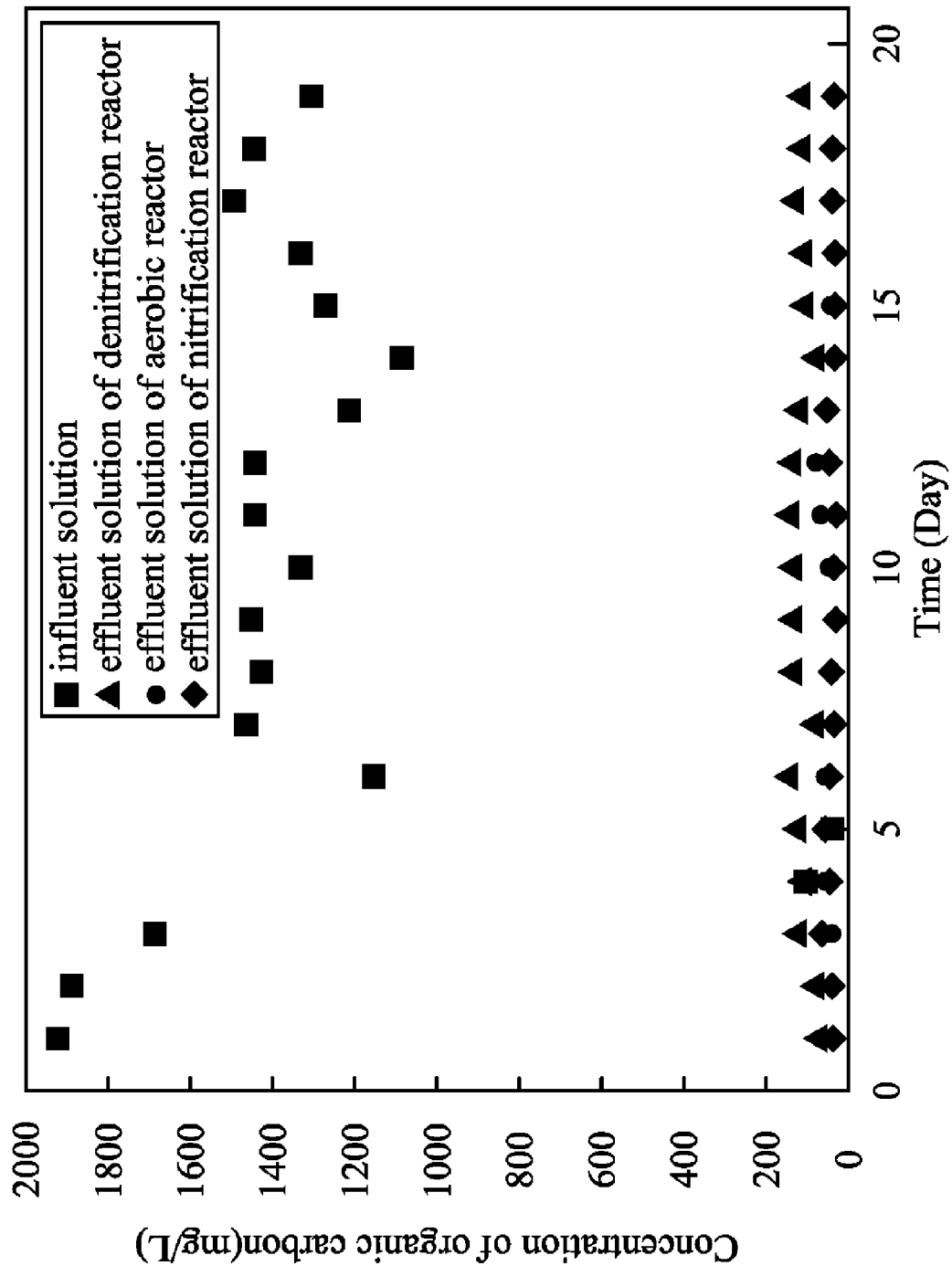
FIG. 6 shows the concentration of organic carbon in the effluent solution from a denitrification reactor, an aerobic reactor, and a nitrification reactor.

FIG. 6 illustrates the concentration of the organic carbon in the effluent solution from a denitrification reactor 32, an aerobic reactor 34, and a nitrification reactor 36, respectively. Referring to FIG. 6, the concentration of the organic carbon in the influent was 1500 to 2000 mg/L. After treatment, the concentration of the organic carbon in the effluent of the denitrification reactor 32 was about 100 to 200 mg/L, and that of the aerobic reactor 34 and nitrification reactor 36 both was 30 mg/L. The results indicated that the aerobic reactor 34 of the invention can significantly decrease the concentration of the organic carbon in the wastewater.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for treating ammonia-based wastewater, comprising:
    conducting ammonia-based wastewater into a first reactor, wherein the first reactor comprises denitrification bacteria for denitrification;
    conducting effluent of the first reactor into a second reactor, wherein the second reactor includes an aerator and aerobic heterotrophic bacteria, and has an HRT (hydraulic retention time) of less than 6 hours for reducing the organic materials and decreasing the C/N ratio in an effluent of the second reactor;
    conducting the effluent of the second reactor into a third reactor, wherein the third reactor comprises nitrification bacteria to convert ammonia in the effluent of second reactor to nitrite and nitrate, and the nitrification bacteria are carried on carriers in the third reactor; and
    conducting effluent of the third reactor into a solid-liquid-separating reactor for separating the solids and liquids in the effluent of the third reactor.

2. The method as claimed in claim 1, wherein the second reactor has an HRT of about 4 to 6 hours.

3. The method as claimed in claim 1, wherein the third reactor has a C/N ratio of less than 5.

4. The method as claimed in claim 1, wherein the third reactor has a C/N ratio of about 1 to 2.

5. The method as claimed in claim 1, wherein the ammonia-based wastewater comprises ammonia or organic nitrogen including TMAH and/or MEA.

6. The method as claimed in claim 1, wherein the ammonia-based wastewater is treated with an anaerobic process before the ammonia-based wastewater is conducted into the first reactor.

7. The method as claimed in claim 1, further adding a carbon source to the first reactor.

8. The method as claimed in claim 1, wherein the effluent or sludge of the third reactor and/or solid-liquid separating reactor is (are) conducted back into the first reactor.

* * * * *